United States Patent
Kockmann et al.

(10) Patent No.: US 7,274,725 B2
(45) Date of Patent: Sep. 25, 2007

(54) SYSTEM AND METHOD FOR ADAPTIVE CARRIER OCCUPANCY IN A FREQUENCY HOPPING SPREAD SPECTRUM SYSTEM

(75) Inventors: Juergen Kockmann, Duesseldorf (DE); Uwe Sydon, Duesseldorf (DE); Olaf Dicker, Rees (DE)

(73) Assignee: Siemens Communications, Inc., Boca Raton, FL (US)

( * ) Notice: Subject to any disclaimer, the term of this patent is extended or adjusted under 35 U.S.C. 154(b) by 720 days.

(21) Appl. No.: 09/751,949

(22) Filed: Dec. 28, 2000

(65) Prior Publication Data

US 2002/0085621 A1 Jul. 4, 2002

(51) Int. Cl.
*H04B 1/713* (2006.01)
*H04B 7/212* (2006.01)
*H04J 3/00* (2006.01)
*H04L 12/43* (2006.01)

(52) U.S. Cl. ............... 375/132; 370/337; 370/347; 370/459

(58) Field of Classification Search ........ 375/132–133, 375/135–136, 364–365, 368, 260; 370/336–337, 370/345, 347, 350, 458, 459, 478, 480, 482
See application file for complete search history.

(56) References Cited

U.S. PATENT DOCUMENTS

| 6,434,183 B1 * | 8/2002 | Kockmann et al. ......... 375/132 |
| 6,693,885 B1 * | 2/2004 | Sydon et al. ............... 370/337 |
| 7,082,113 B1 * | 7/2006 | Matusevich ................. 370/330 |

FOREIGN PATENT DOCUMENTS

| CN | 1276113 A | 12/2000 |
| EP | 0 767 551 A2 * | 4/1997 |
| WO | WO98/59438 * | 12/1998 |
| WO | WO99/09678 * | 2/1999 |
| WO | WO99/37110 | 7/1999 |
| WO | WO 00/74256 A1 | 12/2000 |

\* cited by examiner

*Primary Examiner*—Young T. Tse

(57) ABSTRACT

A frequency hopping spread spectrum telecommunication system is provided, which selects carrier frequencies based on the number of active slots. The duration that carriers have been employed is then based on the number of active slots (401, 402), rather than the number of frames (22). Thus, non-interfered with carriers can be used more often than interfered with carriers, thereby improving voice quality.

20 Claims, 4 Drawing Sheets

SYSTEM AND METHOD FOR ADAPTIVE CARRIER OCCUPANCY IN A FREQUENCY HOPPING SPREAD SPECTRUM SYSTEM

BACKGROUND OF THE INVENTION

1. Field of the Invention

The present invention relates to communication systems and, in particular, to an improved cordless telephone system.

2. Description of the Related Art

The Digital Enhanced Cordless Telecommunications (DECT) standard, promulgated by the European Telecommunications Standards Institute (ETSI), is an accepted standard for cordless telephones. DECT is based on a microcellular radio communication system using Time Division Multiple Access and Time Division Duplexing.

The Worldwide Digital Cordless Telecommunications (WDCT) system has been developed by Siemens Wireless Terminals as an FCC-compliant modification of DECT. WDCT is a frequency hopping spread spectrum system employing adaptive differential pulse code modulation (AD-PCM).

The voice quality in a frequency hopping spread spectrum system depends largely on the number of interfered carriers. When a TDMA frame structure is used and a carrier is interfered with by a strong interferer, the probability that bit errors will occur, or a whole slot will be lost, is very high.

According to FCC part 15, a system must use in a random order at least n carriers. For a 2.4 GHz system, n=75. The number z of available carriers depends on system design. In addition, FCC part 15 requires that each carrier must not be used longer than x milliseconds every y seconds. For a 2.4 GHz system, x=400 ms, and y=30 seconds.

WDCT is based on a TDMA frame structure with a frame length of 10 milliseconds. Because of the TDMA structure, the frame is divided in receive and transmit slots. An exemplary WDCT frame is shown in FIG. 1. Shown are a plurality of receive slots RX1-RX4 and a plurality of transmit slots TX1-TX4. Each active transmit or receive slot has a duration of 833 microseconds. If there are fewer than four connections, i.e., fewer than four pairs of slots are active, no data is transmitted during the inactive slots. Further, between two active slots an inactive slot of duration 417 microseconds is implemented.

According to a typical implementation of WDCT, the hop algorithm that generates the frequencies in a random order assumes that if one connection is active (i.e., one transmit and one receive slot are used), a frequency will be occupied for one frame length (10 ms). In such implementations, each carrier can be used only 40 times in a 30 second timeframe (400 ms/10 ms=40).

SUMMARY OF THE INVENTION

These and other drawbacks in the prior art are overcome in large part by a system in accordance with the present invention. A frequency hopping spread spectrum telecommunication system is provided, which selects carrier frequencies based on the number of active slots. The duration that carriers have been employed is then based on the number of active slots, rather than the number of frames. Thus, non-interfered with carriers can be used more often than interfered with carriers, thereby improving voice quality.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 2-6 illustrate a telecommunications system including telecommunications devices according to an implementation of the present invention. A frequency hopping spread spectrum telecommunication system is provided, which selects carrier frequencies based on the number of active slots. The duration that carriers have been employed is then based on the number of active slots, rather than the number of frames. Thus, non-interfered with carriers can be used more often than interfered with carriers, thereby improving voice quality.

Figure 1:
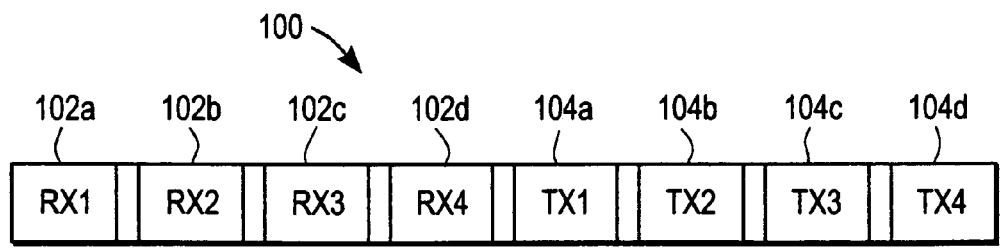
FIG. 1 is a diagram of an exemplary frame.
Figure 4:
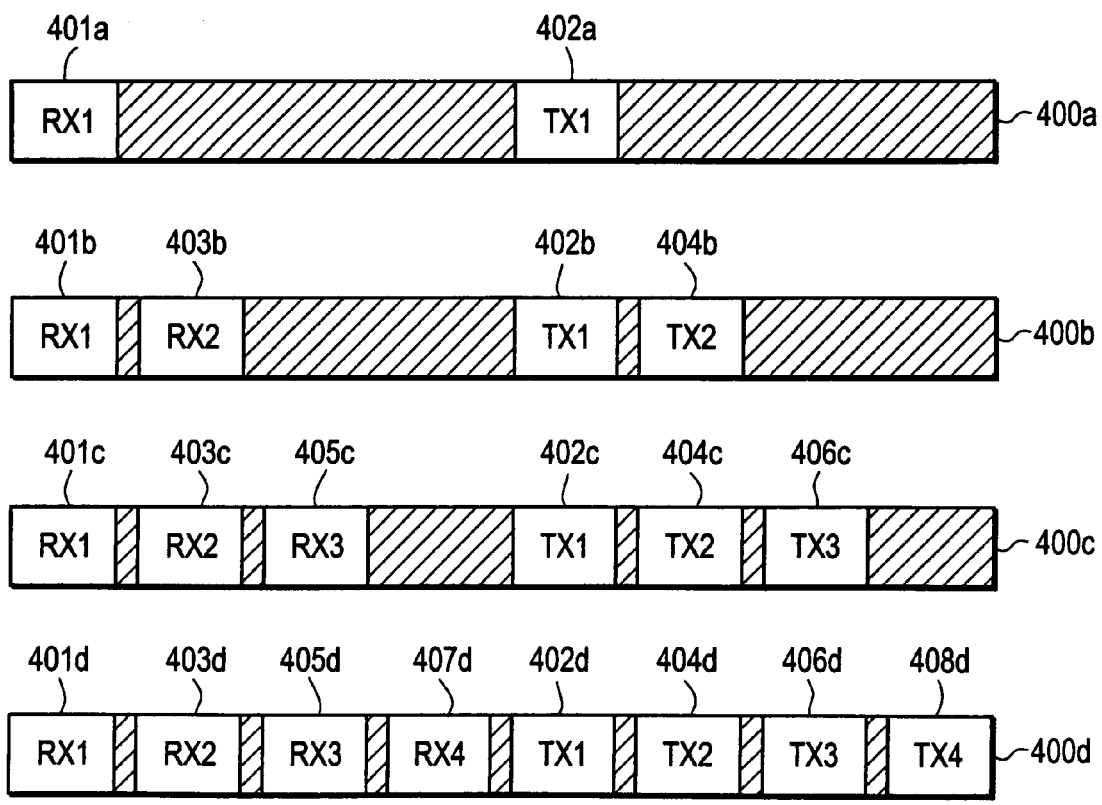
FIG. 4A-FIG. 4D Illustrate calculating frequency duration according to an implementation of the invention.
Figure 2:
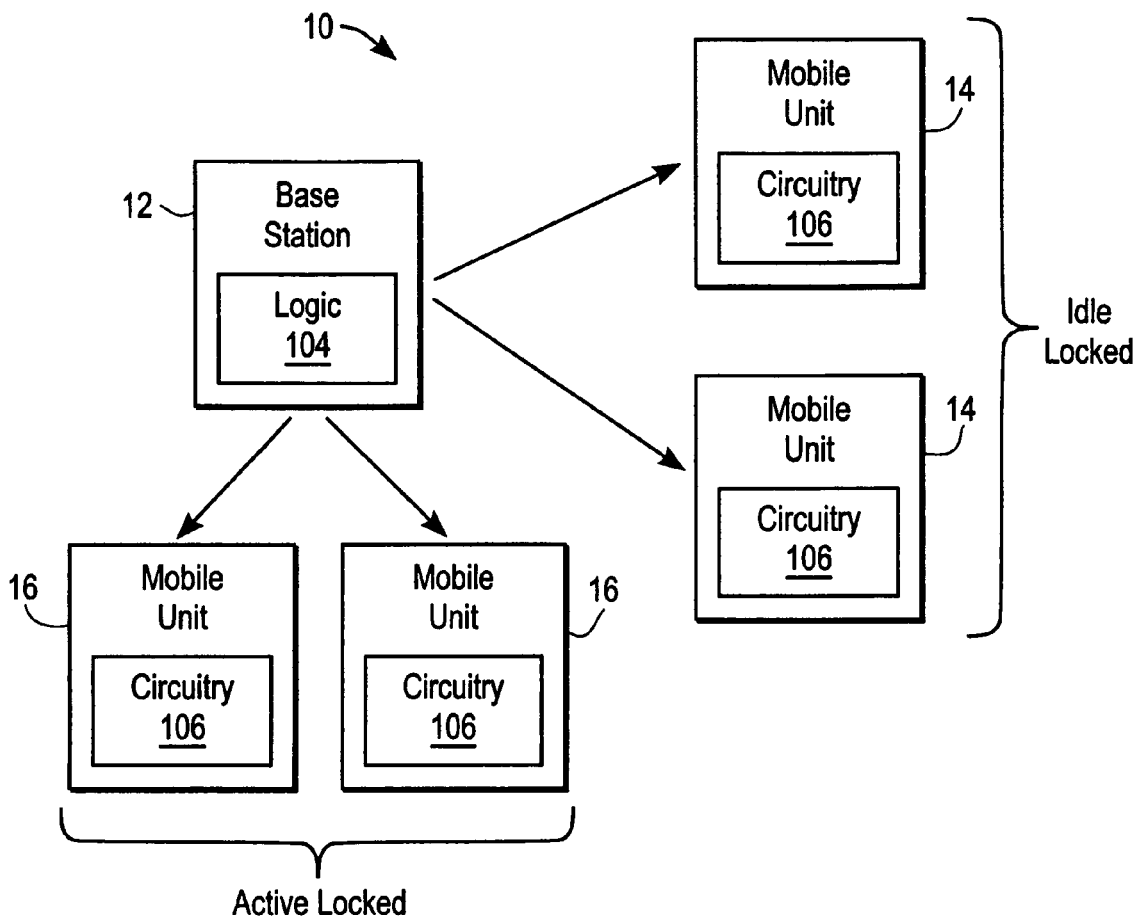
FIG. 2 is a block diagram of one implementation of an exemplary radio-frequency system according to the present invention.

FIG. 2 is a block diagram of one implementation of an exemplary radio-frequency system according to the present invention. In particular, the system may be implemented as a frequency hopping cordless telephone system, indicated generally as 10. The system 10 includes one or more base stations 12, each of which can also be referred to as a fixed part (FP). Each base station 12 can support communication with a plurality of mobile units or handsets 14 and handsets 16 using radio frequencies. The interface between base station 12 and handsets 14 and 16 can be referred to as the air interface. The base station 12 includes control logic 104 and the handsets 14 and 16 include control logic 106 according to the present invention, as will be explained in greater detail below. An exemplary system suitable for use with a system according to the present invention is the Gigaset system, available from Siemens Corp.

In operation, base station 12 can support a defined total number of handsets 14 and 16. For example, in one implementation, base station 12 can support a total of eight handsets, either idle locked or active locked. Of the total number of handsets, a given number 'M' can be active locked handsets 16. For example, base station 12 could support up to four active locked handsets 16 from the eight total handsets. Of the remaining handsets, base station 12 can support a given number "N" of idle locked handsets 14. For example, "N" can be less than or equal to the difference between the total number of supported handsets (e.g., 8) and the number "M" of active locked handsets 16 (e.g., 0-4). Idle locked handsets 14 are handsets that are currently inactive but are in contact with and in sync with base station 12. Base station 12 can communicate with handsets 14 and handsets 16 using a time division multiplexed (TDM) frame-based communication protocol.

In the implementation of FIG. 2, the system 10 uses an ISM (Industrial, Scientific, Medical) band of radio frequencies for supporting communication between base station 12 and handsets 14 and 16. For example, the system 10 can use the ISM band extending from 2.4 GHz to 2.4835 GHz. An advantage of using the ISM band is that it is unlicensed and does not require a license fee for use. However, in order to operate within FCC or other government regulations, the system 10 implements a frequency hopping scheme. This allows the system 10 to support robust cordless communications in the ISM band white operating within regulation guidelines. Under the frequency hopping scheme, base station 12 and handsets 14 and 16 move in the time domain from frequency to frequency.

Because of the changing frequency, handsets are initially in an unlocked state when entering an area serviced by base station 12. Unlocked handsets can then "listen" at a specific radio frequency to attempt to lock on to base station 12. When the base station 12 hops to that frequency specific frequency, unlocked handsets can identify and receive control data transmitted by base station 12. This allows the unlocked handsets to lock with base station 12 and sync with the frequency hopping scheme.

Figure 3:
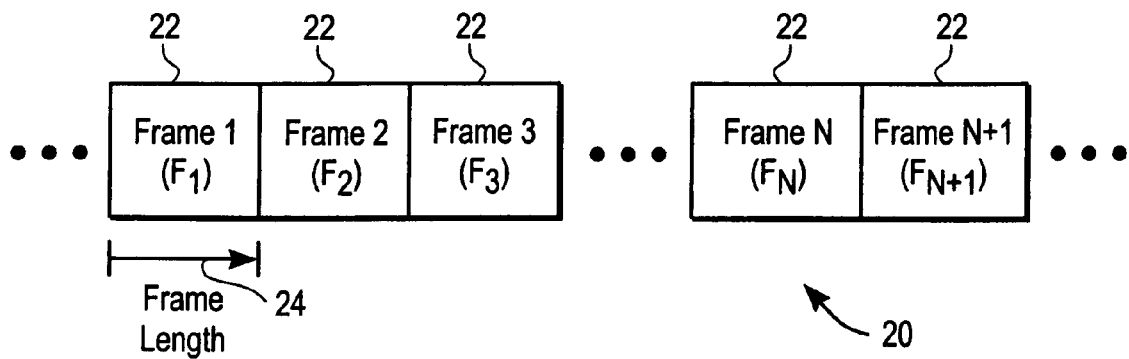
FIG. 3 is a diagram of frame frequencies according to an implementation of the invention.

FIG. 3 is a block diagram of one embodiment of frame frequencies for a frequency hopping cordless telephone system. As shown, a frame structure, indicated generally at 20, comprises a plurality of frames 22 each having a frame length 24. Each frame 22 follows immediately after the previous frame 22 in the time domain.

In the embodiment of FIG. 3, a different frequency ($F_1$, $F_2$, $F_3$ ... $F_N$, $F_{N+1}$, ...) is associated with each frame 22 and is used during that frame 22 for communication across the air interface between base station 12 and handsets 14 and 16. This change from frequency to frequency is handled by the frequency hopping scheme implemented by base station 12 and handsets 14 and 16. During the duration of a given frame 22, base station 12 and handsets 14 and 16 communicate using the selected frequency for that frame 22. When the next frame 22 begins, base station 12 and handsets 14 and 16 communicate using a new selected frequency. In one embodiment, frame length 24 is ten milliseconds, thus the frequency being used changes every ten milliseconds.

FIG. 4A-FIG. 4D illustrate time calculations for frequency hopping according to the present invention. As mentioned, the FCC defines requirements for use of frequencies within the ISM band. For example, within a 30 second period, the regulations limit the maximum length of time that a system can use one frequency to 0.4 seconds. As will be described in greater detail below, the present invention uses only active slots to determine the amount of time, up to the 0.4 seconds, a frequency has been used.

FIG. 4A illustrates a frame 400a with only two active slots 401a, 402a, i.e., only one active connection. The duration of the slots is 2×833 microseconds=1.67 milliseconds. Thus, in each 400 ms, each carrier can be used nearly 240 times for each slot pair.

FIG. 4B illustrates a frame 400b using two active connections, i.e., four active slots 401b, 402b, 403b, 404b. The length of the slots is 4×833 microseconds=3.332 milliseconds, so a carrier can be used 120 times.

FIG. 4C illustrates a frame using three active connections, i.e., six active slots 401c-406c. The duration of the slots is 6×833 microseconds=4.998 milliseconds. Thus, in each 400 ms, each carrier can be used nearly 80 times.

Finally, even in the case in which there are four active connections, i.e., eight slots 401d-408d (FIG. 4D), the present invention allows for improved selection. If only the active slots 401d-401d, and not the inactive interval periods, are used for the calculation, then each carrier can be used for 60 times.

While any method for actually selecting frequencies may be employed, one such method for selecting the frequencies is described in U.S. patent application Ser. No. 09/113,539. now U.S. Pat. No. 6,259,722, filed Jul. 10, 1998, titled "Method and System for Table Implemented Frequency Selection in a Frequency Hopping Cordless Telephone System," which is hereby incorporated by reference In its entirety as if fully set forth herein.

Figure 5:
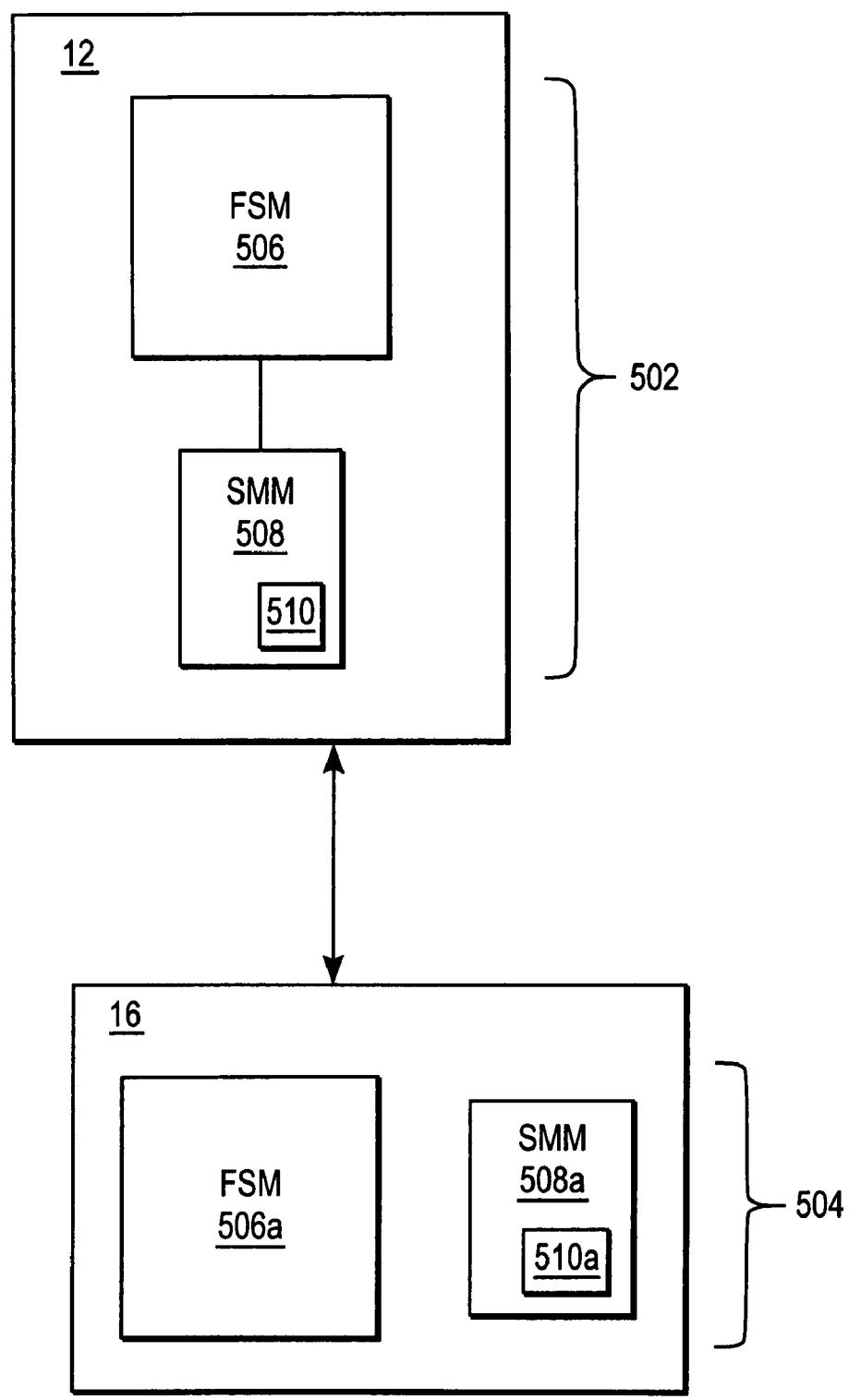
FIG. 5 is a block diagram of a system according to an implementation of the present invention.

FIG. 5 is a block diagram of a system, generally indicated at 502, for adaptive carrier occupancy in a frequency hopping cordless telephone system. The system 502 is operable to implement a scheme that selects a frequency for communication between a base station 12 and one or more handsets 16, based on a number of active slots per frame. In the embodiment shown, the system resides in the base station 12 and is implemented as part of the control logic 104. A similar system 504 resides in the handset 16 and may be implemented as part of the control logic 106. The systems 502, 504 are operable to select the same frequency at the same time, such that the base station 12 and the handset 16 can maintain communication while hopping.

The system 502 includes a frequency selection module 506 and a slot monitor module 508, including a counter 510. The modules 506, 508 may be implemented as various combinations of executable software code running on one or more processors, and associated storage devices, such as random access memory, read only memory, or mass storage such as a magnetic disk drive.

The frequency selection module 506 may operate according to any frequency hopping scheme, and receives inputs from the slot monitor module 508, as will be described in greater detail below. More particularly, the slot monitor module 508 monitors transmissions and, using the counter 510, counts the number of active slots being sent per frame. This can include simply counting the number of active connections, or methods employing CRC checksum for each burst, bit error rate, or signal strength.

The slot monitor module 508 then informs the frequency selection module of the number of active slots. The duration of these slots is then used by the frequency selection module 505 in its calculation of the amount of time available during a particular 30 second period that a given carrier frequency can be used.

For example, suppose a given frequency has been used for thirty (30) active connections. Thus, the frequency has been used for 100.2 milliseconds. The same frequency can be used for another 140 milliseconds, or 83 single frame active connections (e.g, FIG. 4A), 42 double frame active connections (e.g., FIG. 4B), and so on.

The system 504 residing in the handset 106 operates in a similar manner including FSM 506a, SMM 508a and counter 510a. It is operable to select frequencies using the same frequency hopping scheme as the system 502, such that the base station 12 and the handset 16 can continue communication as they hop frequencies. Further, various control data is exchanged between the base station and the handset to ensure that the units both have the same number of active slots calculated.

More particularly, when handset 16 initially enters an area serviced by the base station 12, it "listens" on one particular frequency. As the base station 12 hops through frequencies, it transmits control data. At some point, the base station 12 will transmit control data on the same frequency that handset 16 is listening on. The control data is used by the handset to synchronize its frequency hopping scheme to that of the base station.

In operation, the base station 12 and the handset 16 synchronize to a frequency hopping scheme so that they can communicate. Then, each monitors whether the slots associated with each frame are active. The base station 12 then sends a control signal to the handset 16 indicative of the amount of time used at the particular frequency, based on the number of active slots. The handset 16 and the base station 12 then update their calculations of available frequencies based on this determination.

Figure 6:
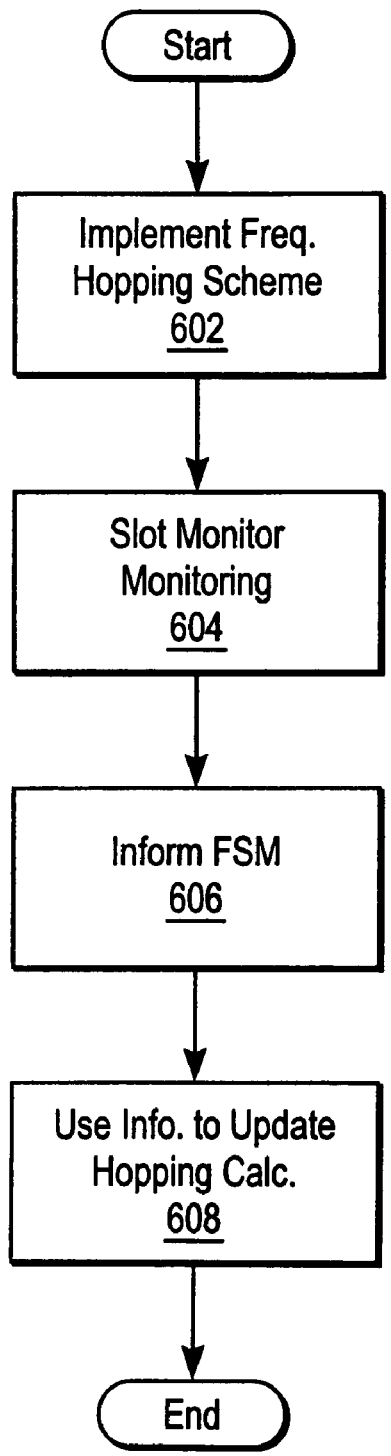
FIG. 6 s a flowchart illustrating operation of an implementation of the invention.

FIG. 6 is a flowchart of one implementation of a method according to the present invention. The method can be implemented, for example, by the system 502 and 504 of FIG. 5. In a step 602, the system operates using a frequency hopping scheme, for example, implemented by the frequency selection module 506 of the base station and the frequency selection module 506a of the handset 16. As discussed above, the frequency is changed every 10 milliseconds, or every frame, and no one frequency can be used for more than 400 milliseconds every 30 seconds. In a step 604, the slot monitor modules monitor each transmit and receive slot in each frame, i.e., at each frequency. In a step 606, signaling indicative of this information is provided to the frequency selection module 506. For example, the data provided may be the number of inactive slots, or the actual time of the inactive (or active) slots, associated with the particular frame and hence frequency, or the amount of time still available in a given 30 second period that the corresponding frequency may be used. The base station may also transmit this information to the handset. In a step 606, the frequency selection modules 506 and 506a incorporate this information into their frequency hopping algorithm calculation. For example, this may include an exchange of control data between handset and base station.

The invention described in the above detailed description is not intended to be limited to the specific form set forth herein, but is intended to cover such alternatives, modifications and equivalents as can reasonably be included within the spirit and scope of the appended claims.

What is claimed is:

1. A method for use in frequency selection in a frequency hopping cordless telephone system employing a predetermined frame length, comprising:
   identifying active slots in a frame; and
   determining a duration of carrier usage based on durations of numbers of said active slots.

2. A method in accordance with claim 1, said predetermined frame length having a duration about ten milliseconds.

3. A method in accordance with claim 2, said slots comprising transmit and receive slots each having a duration of 833 microseconds.

4. A method in accordance with claim 3, further comprising limiting a use of a particular carrier to less than 400 milliseconds every thirty seconds.

5. A system for use in frequency selection in a frequency hopping cordless telephone system employing a predetermined frame length, comprising:
   means for identifying active slots in a frame; and
   means for determining a duration of carrier usage based on durations of numbers of said active slots.

6. A system in accordance with claim 5, said predetermined frame length having a duration about ten milliseconds.

7. A system in accordance with claim 6, said slots comprising transmit and receive slots each having a duration of 833 microseconds.

8. A system in accordance with claim 7, further comprising limiting a use of a particular carrier to less than 400 milliseconds every thirty seconds.

9. A device for use in frequency selection in a frequency hopping cordless telephone employing a predetermined frame length, comprising:
   a slot monitoring module adapted to identify active slots in a frame; and
   a frequency selection module adapted to determine a duration of carrier usage based on durations of numbers of said active slots.

10. A device in accordance with claim 9, said predetermined frame length having a duration about ten milliseconds.

11. A device in accordance with claim 10, said slots comprising transmit and receive slots each having a duration of 833 microseconds.

12. A method for use in frequency selection in a frequency hopping cordless telephone system employing a predetermined frame length, comprising:
   identifying a number of active slots in a frame; and
   determining a duration of carder usage based on total durations of said number of active slots.

13. A method in accordance with claim 12, said predetermined frame length having a duration about ten milliseconds.

14. A method in accordance with claim 13, said slots comprising transmit and receive slots each having a duration of 833 microseconds.

15. A method in accordance with claim 14, further comprising limiting a use of a particular carrier to less than 400 milliseconds every thirty seconds.

16. A cordless telephone system, comprising:
   a fixed station including a frequency select module and a slot monitor module: and
   a mobile station;
   wherein the fixed station and the mobile station communicate according to a frequency hopping scheme with frequencies chosen by said frequency select module with input from said slot monitor module, said slot monitor module providing said frequency select module with a count of a number of active slots being sent per frame.

17. A cordless telephone system in accordance with claim 16, wherein a frame length of said frame has a duration about ten milliseconds.

18. A cordless telephone system in accordance with claim 17, said slots comprising transmit and receive slots each having a duration of 833 microseconds.

19. A cordless telephone system in accordance with claim 18, further comprising limiting a use of a particular carrier to less than 400 milliseconds every thirty seconds.

20. A cordless telephone system in accordance with claim 16, wherein a duration of use of a carrier frequency is based on a duration of said number of active slots.

* * * * *